United States Patent [19]

Tamburelli

[11] 4,029,903
[45] June 14, 1977

[54] RECEIVER FOR PSK DIGITAL SIGNALS

[75] Inventor: Giovanni Tamburelli, Torino, Italy

[73] Assignee: CSELT - Centro Studi E Laboratori Telecomunicazioni, Torino, Italy

[22] Filed: Oct. 6, 1975

[21] Appl. No.: 620,140

[30] Foreign Application Priority Data

Oct. 4, 1974 Italy .................................. 69965/74
Apr. 2, 1975 Italy .................................. 67850/75

[52] U.S. Cl. .................................. 178/88; 325/60
[51] Int. Cl.² .................................. H04B 1/00
[58] Field of Search ............... 178/88, 67; 325/320, 325/30, 60

[56] References Cited

UNITED STATES PATENTS

| | | | |
|---|---|---|---|
| 3,447,085 | 5/1969 | De Haas | 178/67 |
| 3,706,945 | 12/1972 | Yanagidaira | 178/67 |
| 3,794,921 | 2/1974 | Unkauf | 178/88 |
| 3,806,807 | 4/1974 | Nakamura | 178/67 |
| 3,887,768 | 6/1975 | Forney | 178/67 |
| 3,935,535 | 1/1976 | Motley | 325/42 |

Primary Examiner—Robert L. Griffin
Assistant Examiner—Michael A. Masinick
Attorney, Agent, or Firm—Karl F. Ross; Herbert Dubno

[57] ABSTRACT

In a phase-shift-keying (PSK) signaling system with or without amplitude modulation, using two conjugate channel carriers of like frequency, the signals incoming at a receiver input over the two channels are coherently detected and filtered to supply a pair of coordinates defining a point on an orthogonal matrix divided into eight sectors, each sector representing a respective signal level. The coordinate values are quantized and translated into selective energization of two mutually orthogonal matrix leads whereby an associated AND gate conducts and emits a signal identifying the sector encompassing the intersection of these leads. The sector-identifying signal addresses a read-only memory which delivers a corresponding output signal to a processor and feeds back corrective signals to a pair of summing circuits for superposition upon the next input signals in order to compensate for both intrachannel and interchannel distortion. If adjacent levels are distinguished not only by the phase shifts of the channel carriers but also by changes in their amplitudes, the corrective signals fed back by the memory are of correspondingly different amplitudes.

10 Claims, 6 Drawing Figures

RECEIVER FOR PSK DIGITAL SIGNALS

FIELD OF THE INVENTION

My present invention relates to a digital signaling system of the phase-shift-keying (PSK) type and more particularly to a receiver for multilevel signals transmitted via two relatively phase-shifted channel carriers in such a system.

BACKGROUND OF THE INVENTION

In order to recover the transmitted digital signals from two conjugate carrier waves of like frequency identifying $n$ different signal levels by their relative amplitudes, it is known to demodulate these carriers with the aid of coherent detectors having control inputs connected to sources of two oscillations of carrier frequency in relative phase quadrature, these oscillations thus being of the form $K\cos\omega_c t$ and $K\sin\omega_c t$ where K is a constant and $\omega_c$ is the pulsatance of the carrier waves. With, say, oscillation $K\sin\omega_c t$ suitably synchronized with a carrier oscillator at the transmitting end to define a reference axis, the coherently demodulated carriers give rise to two input voltages defining respective coordinates of an orthogonal matrix locating a point on that matrix which lies on a radius including with the reference axis a certain angle $\theta$ adapted to assume — ideally — any of $n$ different values. In practice, this angle will vary on reception within certain tolerance limits about the $n$ nominal values of $\theta$.

These variations are due, at least in part, to two kinds of distortions occurring in such two-channel systems, namely an intrachannel distortion between signals transmitted in successive cycles and an interchannel distortion resulting from the interaction of substantially concurrently transmitted signals on the two channels. For a discussion of this general problem, in a somewhat different system using quadrature amplitude modulation (QAM), reference may be made to an article by D. D. Falconer and G. J. Foschini entitled "Theory of Minimum Mean-Space-Error QAM Systems Employing Decision Feedback Equalization", Bell System Technical Journal, December 1973, page 1821.

OBJECTS OF THE INVENTION

The general object of my present invention is to provide means for effectively suppressing both aforementioned types of distortion in PSK receiver, taking into account the correlation existing in such a system — in contradistinction to a QAM system — between the signal components arriving over the two channels.

A more particular object is to provide distortion-suppression means effective also in a PSK system in which amplitude modulation is utilized besides angle modulation in order to distinguish between adjacent signal levels.

It is also an object of my invention to provide means for improving the signal-to-noise ratio in the output of a receiver in such a PSK system.

SUMMARY OF THE INVENTION

In accordance with my present invention, a receiver for a pair of conjugate carrier waves with or without amplitude modulation (as discussed above) includes a decision unit connected to the demodulators of the two channels for generating an angle signal 5 depending on the magnitudes of a first and a second input voltage derived by these demodulators from the respective carrier waves, this angle signal identifying one of $n$ sectors into which the aforementioned orthogonal matrix is divided. The decision unit also generates two collateral signals representing conjugate trigonometric functions $V\sin\theta$ and $V\cos\theta$ of the angle signal 5, V being a constant which is identical for all sectors when there is no amplitude modulation but which assumes different values V', V'' for alternate sectors in systems using such amplitude modulation in transmission. A feedback circuit converts these collateral signals into at least two but preferably four corrective voltages superimposed upon succeeding input voltages, normally in an immediately following signaling cycle, to compensate for distortions which are determined by the preceding input voltages. The angle $\theta$ is usually measured between the reference axis (generally the abscissa of the matrix) and a radius bisecting the respective sector.

In an advantageous embodiment, the decision unit comprises two arrays of leads forming a multiplicity of intersections, each of the aforementioned sectors encompassing a unique group of these intersections whereby the joint energization of any two leads, one from each array, identifies a single sector and therefore a single angle signal 5 stored together with the associated collateral signals $V\sin\theta$ and $V\cos\theta$ in one of $n$ stages of a memory which may be of the read-only type if no adaptability to operational changes is required. These $n$ stages may be addressed by respective sets of coincidence (e.g. AND) gates each having input connections to a pair of leads forming one of the intersections of the group encompassed by the corresponding sector. To facilitate the selective energization of a lead pair, the input voltages are quantized with the aid of analog/digital converters and multiplexers.

BRIEF DESCRIPTION OF THE DRAWING

The above and other features of my invention will now be described in detail with reference to the accompanying drawing in which.

SPECIFIC DESCRIPTION

Figure 1:
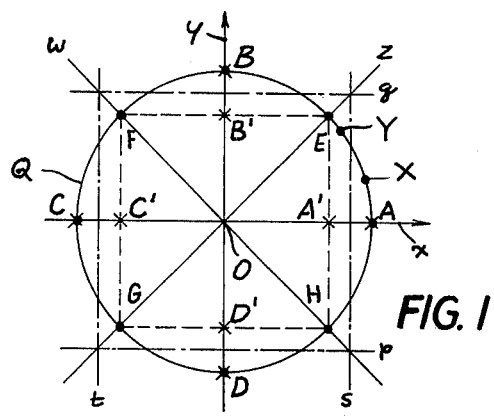
FIG. 1 is a phase diagram for an 8-level PSK system without amplitude modulation.

FIG. 1 shows a phase diagram centered on the intersection O of a reference axis $x$ with an axis $y$ orthogonal thereto as well as two inclined axes $z$ and $w$ including 45° angles therewith. Axes $x$ and $y$ intersect a circle Q, centered on point O, at four points A, B, C, D spaced 90° apart; other points E, F, G, H mark the intersections of circle Q with axes $z$ and $w$. Points A' and C' represent the projections of points E, H and F, G on axis $x$; similarly, points B' and D' are the projections of points E, F and G, H on axus $y$. Thus, point E is defined by its Cartesion coordinates A' and B', point F by its coordinates B' and C', and so on. Any intermediate point on the circle has a major coordinate lying between points A/A' or C/C' on axis $x$ (this being the signal component received on one channel) or between points B/B' or D/D' on axis $y$ (signal component received on the other channel). A vertical line $s$ roughly bisects the distance A - A' and the adjoining octants A - E and H - A; a point X on the circle with an $x$-coordinate between line $s$ and point A is assumed to have strayed from point A whereas a point Y on the circle with an $x$-coordinate between line $s$ and point A' is assumed to have strayed from point E. Similar lines $p$, $q$ and $t$ cut across the distances D - D', B - B' and C - C', respectively. Since these distances are relatively short, discrimination between closely spaced points such as X and Y is difficult and may result in a signal error.

Figure 2:
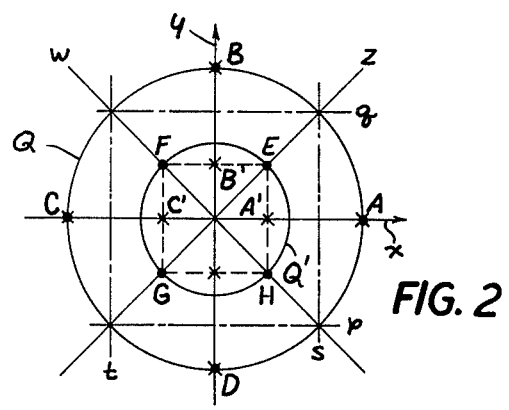
FIG. 2 is a similar phase diagram for a PSK system with low and high amplitudes in alternate signal levels, referred to as AM-PSK.

In FIG. 2 the probability of such error is reduced by locating the points E - H on a smaller circle Q', thereby increasing the distances A - A' etc. The radii of circles Q and Q' represent different amplitudes facilitating discrimination between signal ranges centered on points A - D, on the one hand, and those centered on neighboring points E - H, on the other hand. Such mixed AM-PSK modulation, however, requires rather complex circuitry in conventional signal receivers.

Figure 3:
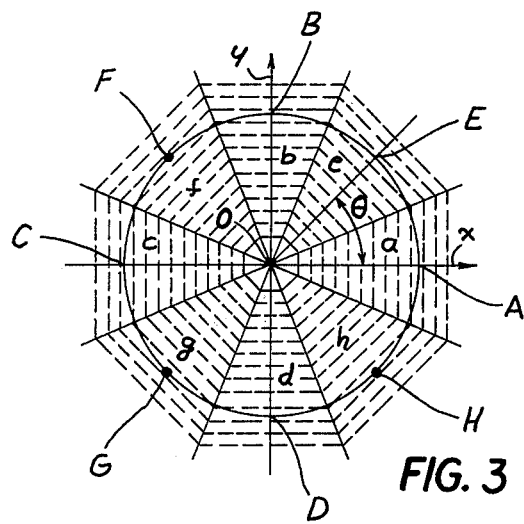
FIG. 3 is a diagram similar to FIGS. 1 and 2, illustrating the division of a matrix into eight sectors corresponding to the several signal levels.

In FIG. 3 I have shown eight 45° sectors $a$, $b$, $c$, $d$, $e$, $f$, $g$, $h$ centered on median radii O - A, O - B etc. which include with axis $x$ an angle $\theta$, that angle replacing the aforementioned Cartesian coordinates as a signaling parameter in a system according to my invention. The angle $\theta$ is 0° for sector $a$, ±45° for sectors $e$ and $h$, ±90° for sectors $b$ and $d$, ±135° for sectors $f$ and $g$, and 180° for sector $c$.

Figure 4:
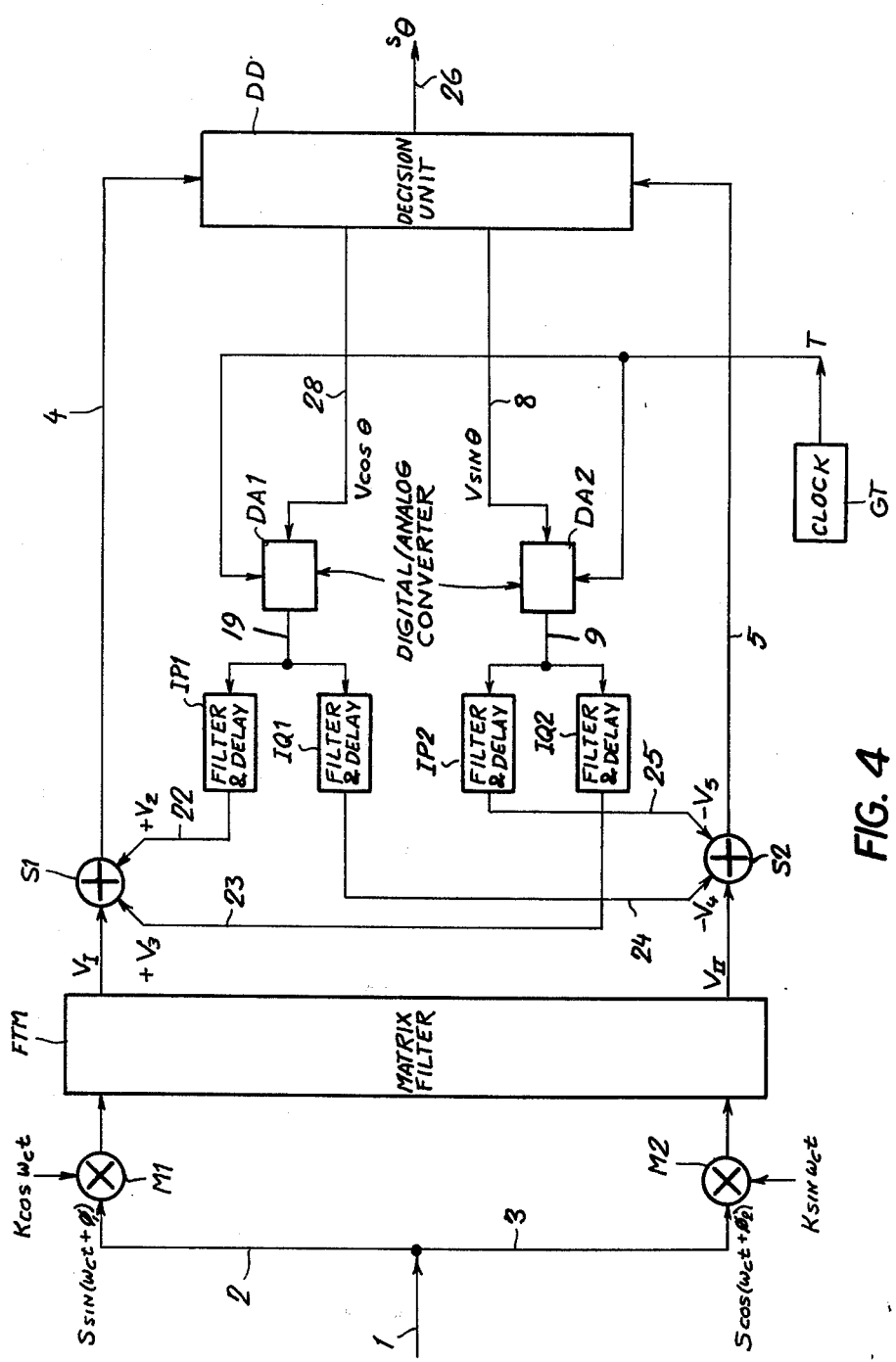
FIG. 4 is an overall block diagram of a PSK receiver embodying my invention.

FIG. 4 shows an incoming communication link 1 on which a signal wave composed of two relatively phase-shifted carriers $S_1 \sin(\omega_c t + \phi_1)$ and $S_2 \cos(\omega_c t + \phi_2)$ is received, this signal wave being channeled via branch lines 2 and 3 to a pair of coherent detectors M1 and M2 whose control inputs receive reference oscillations $K\cos\omega_c t$ and $K\sin\omega_c t$ from conjugate sources, K being a constant. The carrier amplitude $S_1$, $S_2$ is also constant on transmission but may undergo distortions in transit, even as the phase may be distorted by shift angles $\phi_1$, $\phi_2$. These detectors, whose mode of operation is well known per se, produce a pair of pulse trains which are integrated in a low-pass filter stage FTM, e.g. a conventional filter matrix also acting as a pulse shaper. In connection with the design of such filters, reference may be made to the aforementioned article by Falconer and Foschini as well as to an article by A. C. Salazar entitled "Design of Transmitter and Receiver Filters for Decision Feedback Equalization", Bell System Technical Journal, March 1974, page 503. The input voltages thus demodulated, designated $V_I$ and $V_{II}$, are fed to a pair of summing circuits S1, S2 where they are combined with corrective voltages $V_2$, $V_3$ and 4, $V_5$ as more fully described hereinafter. The resulting voltages pass via lines 4 and 5 to a decision unit DD emitting an output signal s, delivered over a line 26 to a nonillustrated processor, and two collateral signals $V\cos\theta$ and $V\sin\theta$ delivered via respective lines 28 and 8 to a pair of digital/analog converters DA1, DA2 which are controlled by a timing signal T from a clock circuit GT. Converter DA1 works via a conductor 19 into a pair of filtering and delay circuits IP1, IQ1 whose output leads 22 and 24 carry the corrective voltages $V_2$ and $V_4$ to summing circuits S1 and S2 for additive and subtractive superposition, respectively, upon input voltages $V_I$ and $V_{II}$. Similarly, converter DA2 works via a conductor 9 into a pair of filtering and delay circuits IP2, IQ2 whose output leads 25 and 23 carry the corrective voltages $V_5$ and $V_3$ to circuits S2 and S1 for subtractive and additive superposition, respectively, upon input voltages $V_{II}$ and $V_I$. Voltages $V_2$ and $V_5$ serve to compensate in-phase or intrachannel distortions whereas voltages $V_3$ and $V_4$ are designed to cancel quadrature or interchannel distortions. Since these two types of distortion arise at different instants in a signaling cycle, the delay of filtering units IP1 and IP2 differs from that of filtering units IQ1 and IQ2. With single-sideband transmission the quadrature filters IQ1 and IQ2 may be Hilbert transformers.

Figure 5:
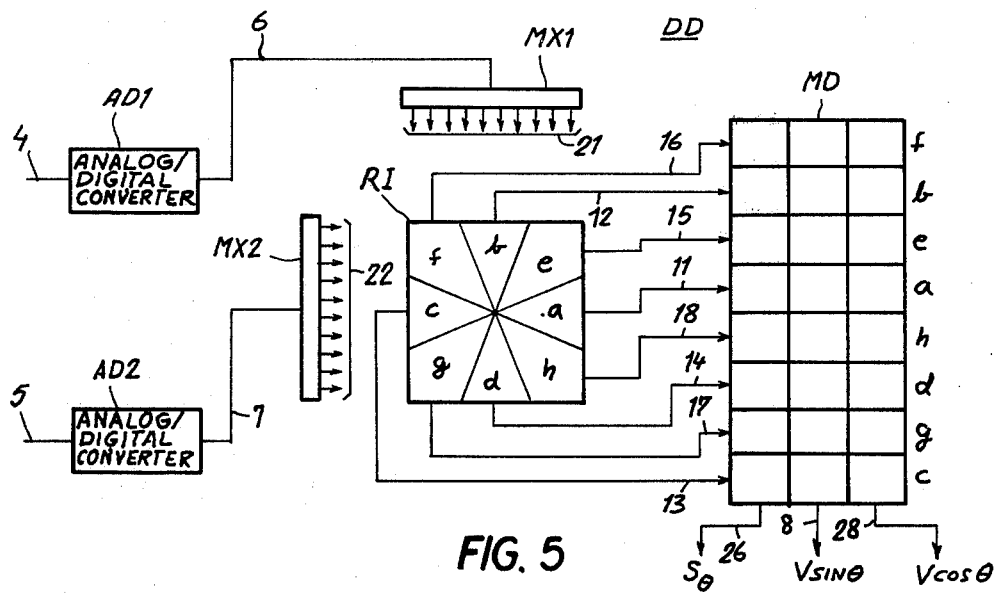
FIG. 5 is a more detailed diagram of a decision unit included in the receiver of FIG. 5.

FIG. 5 shows the decision unit DD as comprising two analog/digital converters AD1, AD2 receiving the modified input voltages $V_I$, $V_{II}$ over lines 4 and 5 and feeding their quantized equivalents to a pair of multiplexers MX1, MX2, respectively. In the present instance it is assumed that each converter AD1, AD2 discriminates between 10 different voltage levels by causing the respective multiplexer MX1, MX2 to energize one of ten outputs 21, 22. Outputs 21 are tied to an array of ten leads $k_1 - k_{10}$ and outputs 22 are tied to an array of ten leads $r_1 - r_{10}$ (FIG. 6) forming columns and rows of an orthogonal matrix RI which serves as an address register for a read-only memory MD, the latter having eight stages that correspond to the several sectors $a - h$ in FIG. 3 and have been similarly designated. These sectors are also present on matrix RI and are linked with the associated memory stages via respective address leads 11 - 18.

Figure 6:
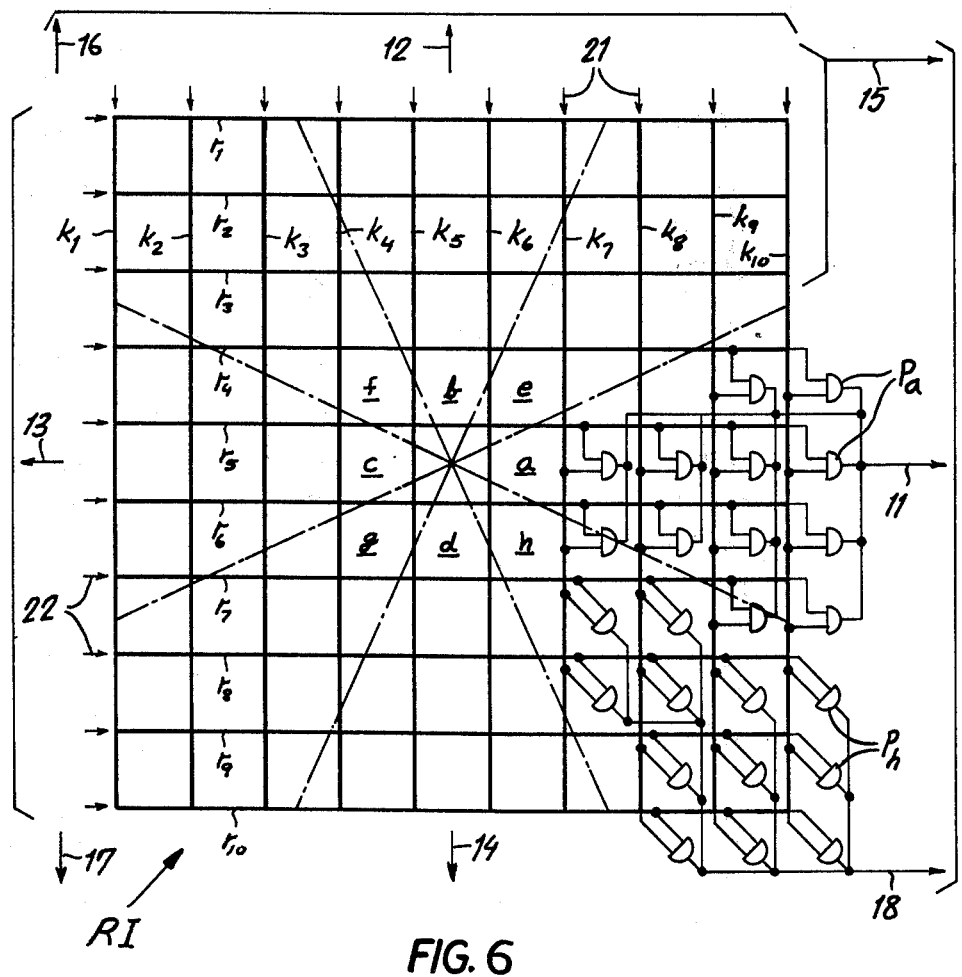
FIG. 6 is a diagram of an addressing network forming part of the decision unit of FIG. 5.

As particularly shown in FIG. 6 for sectors $a$ and $h$, address leads 11 and 18 emanate from respective sets of AND gates $P_a$, $P_h$ each having two inputs respectively connected to a row lead and a column lead intersecting within the corresponding sector. Simultaneous energization of leads $r_8$ and $k_9$, for example, causes one of the gates $P_h$ to conduct and to address the stage $h$ via lead 18. Similar coincidence circuits for the remaining sectors $b - q$ have not been illustrated. Each memory stage is divided into three cells, one storing the corresponding angle signal s and the other two storing the collateral signals $V\sin\theta$ and $V\cos\theta$ in binary form. These stored words are thus read out from the addressed stage via lines 26, 8 and 28, respectively.

In operation, the input voltages $V_I$ and $V_{II}$ received in the first cycle of a sequence of signaling cycles pass unchanged through the summing circuits S1, S2 and, after quantization, call forth the corresponding signals s, $V\sin\theta$ and $V\cos\theta$ from memory MD. The latter two signals are converted into analog voltages and delivered to summers S1 and S2, under the control of clock signal T, in time for superposition upon the input voltages received in the immediately succeeding cycle as described above.

In a system of the AM-PSK type as discussed with reference to FIG. 2, the collateral signals read out from memory stages $a - d$ will have relatively large values $V'\sin\theta$, $V'\cos\theta$ whereas those read out from stages $e - h$ will have relatively small values $V''\sin\theta$, $V''\cos\theta$. A changeover from one type of system to the other thus requires merely a modification of the stored words.

It will be apparent that the coincidence gates $P_a - P_h$ correctly discriminate among the various signal combinations even if they are subject to substantial amplitude variations as well as phase distortions. Naturally, the shape of the matrix RI and the number and configuration of its sectors may be modified in various ways, as long as a substantial number of intersections remain in each sector.

I claim:

1. In a receiver for digital signals transmitted via two conjugate carrier waves of like frequency identifying $n$ different signal levels, in combination:

first and second demodulating means for deriving from said carrier waves a first and a second input voltage defining respective coordinates of an orthogonal matrix divided into $n$ sectors each representing one of said signal levels;

decision means connected to said demodulating means for generating an angle signal, depending on the magnitudes of said input voltages and identifying the corresponding sector, and two collateral signals representing conjugate trigonometric functions of said angle signal; and feedback means connected to said decision means for converting said collateral signals into at least two corrective voltages and superimposing same upon succeeding first and second input voltages to compensate for distortions determined by the preceding input voltages.

2. The combination defined in claim 1 wherein $n = 8$.

3. The combination defined in claim 1 wherein said decision means comprises a first and a second array of leads forming a multiplicity of intersections, each of said sectors encompassing a unique group of said intersections, quantizing means for energizing a lead of said first array in response to said first input voltage and a lead of said second array in response to said second input voltage, and a memory with $n$ stages each addressable by pairs of energized leads intersecting in a respective sector for reading out the corresponding angle signal and associated collateral signals.

4. The combination defined in claim 3 wherein each of said sectors is provided with a respective set of coincidence gates each having input connections to a pair of leads of said arrays forming one of the intersections of the group encompassed by the sector.

5. The combination defined in claim 3 wherein $n$ is an even number, said stages being divided into $n/2$ stages storing correlated signals $V'\cos\theta$, $V'\sin\theta$, where $\theta$ is an angle included between a reference axis and the bisector of any odd-numbered sector, and $n/2$ stages storing corrective signals $V''\cos\theta$, $V''\sin\theta$, $\theta$ being an angle included between said reference axis and the bisector of any even-numbered sector, $V'$ and $V''$ being two different constants.

6. The combination defined in claim 3 wherein said first and second demodulating means comprise a pair of coherent detectors with control inputs connected to sources of two carrier-frequency oscillations in relative phase quadrature, and filter means for integrating respective pulse trains issuing from said detectors.

7. The combination defined in claim 6 wherein said quantizing means comprises a first analog/digital converter connected to said filter means for receiving said first input voltage therefrom, a first multiplexer with an input connected to said first analog/digital converter and with outputs respectively connected to the leads of said first array, a second analog/digital converter connected to said filter means for receiving said second input voltage therefrom, and a second multiplexer with an input connected to said second analog/digital converter and with outputs respectively connected to the leads of said second array.

8. The combination defined in claim 7 wherein said stages are adapted to store said collateral signals in digital form, said feedback means comprising a pair of summing circuits respectively inserted between said filter means on the one hand and said first and second analog/digital converters on the other hand, and a pair of digital/analog converters respectively inserted between said memory on the one hand and said summing circuits on the other hand for translating said collateral signals into said corrective voltages, each of said digital/analog converters having a pair of output connections respectively terminating at said summing circuits.

9. The combination defined in claim 8 wherein said feedback means further comprises filter and delay means in each of said output connections.

10. The combination defined in claim 8, further comprising timing means connected to said digital/analog converters for delivering said corrective voltages to said summing circuits at predetermined instants in a succession of signaling cycles.

* * * * *